US011153619B2

(12) United States Patent
Keen et al.

(10) Patent No.: US 11,153,619 B2
(45) Date of Patent: Oct. 19, 2021

(54) COGNITIVELY DERIVED MULTIMEDIA STREAMING PREFERENCES

(71) Applicant: International Business Machines Corporation, Armonk, NY (US)

(72) Inventors: Martin G. Keen, Cary, NC (US); Hernan A. Cunico, Holly Springs, NC (US); Paul Alexander Raphael Frank, Hamburg (DE); Richard D. Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 16/025,015

(22) Filed: Jul. 2, 2018

(65) Prior Publication Data

US 2020/0007916 A1    Jan. 2, 2020

(51) Int. Cl.
| | |
|---|---|
| *H04N 21/25* | (2011.01) |
| *H04N 21/466* | (2011.01) |
| *H04N 21/2387* | (2011.01) |
| *G06F 16/44* | (2019.01) |

(52) U.S. Cl.
CPC ......... *H04N 21/251* (2013.01); *G06F 16/447* (2019.01); *H04N 21/2387* (2013.01); *H04N 21/4665* (2013.01)

(58) Field of Classification Search
CPC ............. H04N 21/251; H04N 21/2387; H04N 21/4665; H04N 21/6582; H04N 21/26258; H04N 21/25891; H04N 21/44222; H04N 21/234345; H04N 21/8456; G06F 17/30064; G06F 16/447; G06F 16/44
See application file for complete search history.

(56) References Cited

U.S. PATENT DOCUMENTS

| | | | |
|---|---|---|---|
| 6,366,296 B1 | 4/2002 | Boreczky | |
| 7,853,622 B1 | 12/2010 | Baluja | |
| 7,904,924 B1 | 3/2011 | De Heer | |
| 8,220,022 B1 | 7/2012 | Pan | |
| 8,942,542 B1 * | 1/2015 | Sherrets | H04N 21/44008 386/241 |
| 9,077,463 B2 | 7/2015 | Weatherhead | |
| 9,288,511 B2 | 3/2016 | Lin | |

(Continued)

*Primary Examiner* — Anthony Bantamoi
(74) *Attorney, Agent, or Firm* — Aaron N. Pontikos

(57) ABSTRACT

A computer-implemented method for streaming multimedia data includes receiving a request to stream, by a first computing device, a first multimedia data file stored on a second computing device. The computer-implemented method further includes determining a first recommendation to skip viewing of a first logical segment included in the multimedia data file, wherein the first recommendation is based, at least in part, on analyzing a set of user insight information corresponding to a first classification associated with the first logical segment. The computer-implemented method further includes determining that a first confidence score associated with the first recommendation is below a predetermined threshold level. The computer-implemented method further includes providing, in response to determining that the first confidence score is below the predetermined threshold level, the first recommendation to a user while streaming the first multimedia data file via the first computing device.

9 Claims, 3 Drawing Sheets

(56) References Cited

U.S. PATENT DOCUMENTS

| | | | |
|---|---|---|---|
| 9,699,488 B2 | 7/2017 | Köser | |
| 2009/0148058 A1* | 6/2009 | Dane | G06K 9/00 |
| 2014/0086553 A1 | 3/2014 | Moon | |
| 2015/0229977 A1* | 8/2015 | Kanigsberg | H04N 21/2668 |
| 2015/0350730 A1* | 12/2015 | el Kaliouby | A61B 5/165 |
| | | | 725/12 |
| 2015/0358622 A1* | 12/2015 | Lee | H04N 19/159 |
| 2015/0365725 A1* | 12/2015 | Belyaev | H04N 21/458 |
| | | | 725/46 |
| 2016/0092658 A1* | 3/2016 | Tse | G06F 21/57 |
| 2016/0353139 A1* | 12/2016 | Smith | H04N 21/23424 |
| 2017/0366859 A1* | 12/2017 | Chimayan | H04N 21/47217 |
| 2018/0014053 A1* | 1/2018 | Venkatraman | H04N 21/231 |
| 2018/0248926 A1* | 8/2018 | Binns | H04L 65/4092 |
| 2018/0302677 A1* | 10/2018 | Patel | H04N 21/26241 |

\* cited by examiner

COGNITIVELY DERIVED MULTIMEDIA STREAMING PREFERENCES

BACKGROUND

The present invention relates generally to the field of data networks, and more particularly to streaming multimedia data.

Data networks (i.e., computer networks) are digital telecommunications networks that allow computing devices (e.g., personal computers, smartphones, servers, and networking hardware) to exchange data between one another, regardless of whether these devices have a direct connection to each other. In a data network, computing devices are linked together by communication channels, such as cable media (e.g., wires or optic cables), wireless media (e.g., Wi-Fi), or a combination of the two. Computer networks support a wide variety of applications and services, including access to the world wide web, digital video, and digital audio. The most well-known computer network is the Internet.

Media streaming (i.e., streaming video or data streaming) is the constant delivery of multimedia data (i.e., text, audio, images, animations, video, or any combination thereof) from a provider to a client end-user. Generally, streaming describes the act of playing media on one device when the media is actually stored on another device. More particularly, media streaming is video or audio content sent in compressed form over the Internet and played immediately, rather than first being downloaded or saved to the hard drive of the client end-user. Accordingly, media streaming is an alternative to file downloading, in which the client-end user is required to download the entire file before viewing or listening to the file.

Generally, there are two types of streaming: (i) live streaming and (ii) on demand streaming. Live streaming (i.e., true streaming) is the delivery of digital media via data networks to a computing device in real time without saving the media to a storage device. Accordingly, live streams, which are similar to live television broadcasts, are available at one time only. On the other hand, on demand streaming is provided by progressive streaming (i.e., progressive downloading), whereby data is first saved to a storage device and subsequently played from that device. Thus, once the file is saved to the storage device, users can access and stream the file at any time.

SUMMARY

According to one embodiment of the present invention, a computer-implemented method for streaming multimedia data is disclosed. The computer-implemented method includes receiving a request to stream, by a first computing device, a first multimedia data file stored on a second computing device. The first multimedia data file includes a plurality of logical segments, wherein each logical segment in the plurality of logical segments is associated with a type of classification. The computer-implemented method further includes determining a first recommendation to skip viewing of a first logical segment in the plurality of logical segments, wherein the first recommendation is based, at least in part, on analyzing a set of user insight information corresponding to a first classification associated with the first logical segment. The computer-implemented method further includes determining that a first confidence score associated with the first recommendation is below a predetermined threshold level. The computer-implemented method further includes providing, in response to determining that the first confidence score is below the predetermined threshold level, the first recommendation to a user while streaming the first multimedia data file via the first computing device.

According to another embodiment of the present invention, a computer program product for streaming multimedia data is disclosed. The computer program product includes one or more computer readable storage media and program instructions stored on the one or more computer readable storage media. The program instructions include instructions to receive a request to stream, by a first computing device, a first multimedia data file stored on a second computing device. The first multimedia data file includes a plurality of logical segments, wherein each logical segment in the plurality of logical segments is associated with a type of classification. The program instructions further include instructions to determine a first recommendation to skip viewing of a first logical segment in the plurality of logical segments, wherein the first recommendation is based, at least in part, on analyzing a set of user insight information corresponding to a first classification associated with the first logical segment. The program instructions further include instructions to determine that a first confidence score associated with the first recommendation is below a predetermined threshold level. The program instructions further include instructions to provide, in response to determining that the first confidence score is below the predetermined threshold level, the first recommendation to a user while streaming the first multimedia data file via the first computing device.

According to another embodiment of the present invention, a computer system for streaming multimedia data is disclosed. The computer system includes one or more computer processors, one or more computer readable storage media, and computer program instructions. The computer program instructions further include instructions stored on the one or more computer readable storage media for execution by the one or more computer processors. The computer program instructions further include instructions to receive a request to stream, by a first computing device, a first multimedia data file stored on a second computing device. The first multimedia data file includes a plurality of logical segments, wherein each logical segment in the plurality of logical segments is associated with a type of classification. The program instructions further include instructions to determine a first recommendation to skip viewing of a first logical segment in the plurality of logical segments, wherein the first recommendation is based, at least in part, on analyzing a set of user insight information corresponding to a first classification associated with the first logical segment. The program instructions further include instructions to determine that a first confidence score associated with the first recommendation is below a predetermined threshold level. The program instructions further include instructions to provide, in response to determining that the first confidence score is below the predetermined threshold level, the first recommendation to a user while streaming the first multimedia data file via the first computing device.

DETAILED DESCRIPTION

Figure 1:
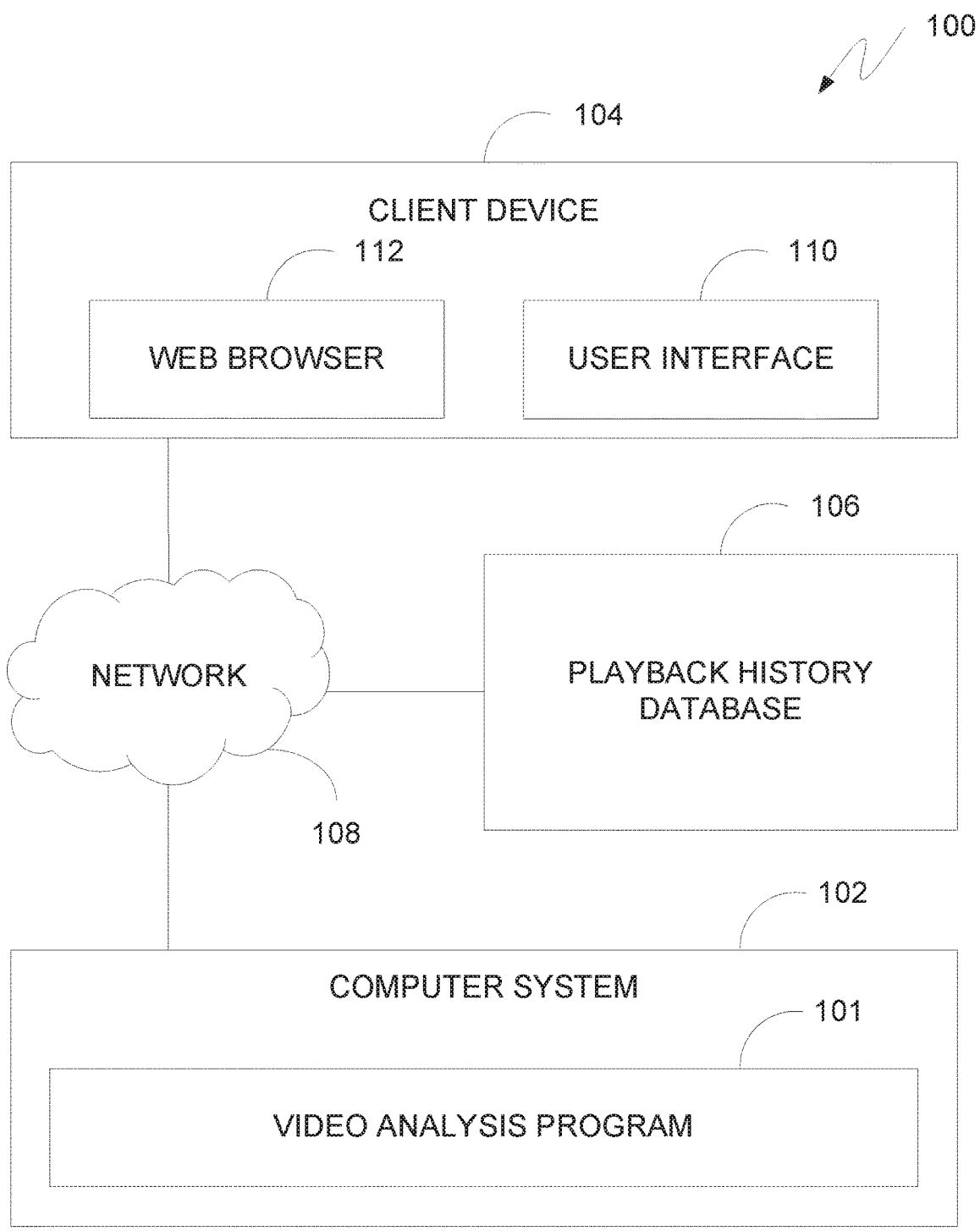
FIG. 1 is a functional block diagram of a network computing environment, generally designated 100, suitable for operation of a video analysis program 101 in accordance with at least one embodiment of the invention.

Streaming refers to the continuous delivery of multimedia data from one source, such as a network service, to an end-user streaming device. Multimedia data to be streamed can be stored in the "cloud," on a personal computer, media server, or network attached storage device ("NAS") and accessed via a web-based or client-based application. When accessed, multimedia data is transmitted by a server application and received and displayed in real-time via a client application, such as a media player. A media player can be an integral part of a web browser, a plug-in, a separate program, or a dedicated device.

Embodiments of the present invention recognize that the ability to stream data is based, at least in part, on bandwidth (i.e., network bandwidth, data bandwidth, or digital bandwidth). The bandwidth or "throughput" of a media stream is measured by its bitrate, which is the amount of data that can be transferred per unit of time. Generally, streaming systems employ real-time data compression technology to lower the amount of bandwidth required for streaming multimedia data. The use of real-time data compression technology stems from the fact that if the bitrate for a given network connection (either at the client-side or server-side) falls below the rate required for continuous playback, interruptions in the streaming service can occur. However, additional factors such as network traffic (i.e., the number of people streaming media at the same time) and the speed of a website's server connection can cause interruptions in the streaming service even when real-time data compression technologies are employed.

Embodiments of the present invention recognize that the ability to stream data is further based, at least in part, on network congestion. Network congestion refers to the saturation of a path used by data packets to flow between a source, such as a routing device, and a destination, such as a client end-user device. Oftentimes, network congestion is the result of too many outgoing streams from a server (e.g., media server or web server) to a router. Network congestion can cause deterioration in the quality of streaming services (e.g., poor video quality, excessive buffering, lagging, stoppage in play, and/or blocking the establishment of new streaming connections) because of queueing delays and packet loss. In some instances, the use of a buffer can alleviate network congestion. Buffering works by storing a portion of the streamed media locally, whereby a media player can continue to play the media from the buffer while waiting for further network transmissions. However, buffers are typically small and if network congestion or the amount of bandwidth is insufficient to transfer enough data before the buffer is depleted, media stoppage can still occur.

Embodiments of the present invention provide for a video analysis program 101 that modifies the streaming sequence of multimedia data based on deriving insights from historical user watch history data. In embodiments of the present invention, insights are accompanied by confidence scores, of which video analysis program 101 utilizes to determine user specific recommendations. Based on the user specific recommendations, logical segments of streaming multimedia data are prevented from being streamed if available computing resources are violated. These user specific recommendations, derived from user specific insights, ensure that the content of those logical segments of multimedia data eliminated from streaming are of disinterest to a user. In other words, a user is likely to skip over the content included in those logical segments of multimedia data that are prevented from being streamed. Accordingly, embodiments of the invention stream only those logical segments of multimedia data that a user is interested in viewing. Furthermore, by eliminating logical segments that are of disinterest to a user in response to determining that available computing resources are violated, embodiments of the present invention decrease the amount of data being streamed. This ultimately results in (i) an increase in the amount of available bandwidth for streaming multimedia data, (ii) a decrease in the amount of computing resources being consumed while streaming multimedia data, and subsequently, (iii) an increase in the amount of computing resources available for streaming multimedia data.

Embodiments of the present invention provide one or more of: features, characteristics, operations and/or advantages to current steaming processes and generally encompass (i) an improvement to at least the field of multimedia data streaming and (ii) a technical solution to one or more of challenges in the field of data networks. Such challenges in the field of streaming multimedia data include, but are not limited to, one or more of: (i) limitations in streaming multimedia data based on an amount of available bandwidth of a client device used for receiving streaming multimedia data, (ii) limitations in streaming multimedia data based on an amount of available bandwidth of a server used for transmitting streaming multimedia data; (iii) limitations in streaming multimedia based on an amount of network congestion, (iv) limitations in streaming multimedia data based on an ability for a computing device, such as a server or router, to transfer data packets in real-time via broadcast, unicast, and multicast mechanisms, (v) limitations in streaming data based on a client device's network speed, and (vi) limitations in streaming multimedia data based on a server's network speed. Certain embodiments of the present invention both recognize and address other challenges that are not specifically addressed herein but are readily understood to be encompassed by the technical solutions described herein.

Embodiments of the present invention provide one or more of: features, characteristics, operations, advantages, and/or improvements to the aforementioned challenges in the field of streaming multimedia data: (i) an increase in the amount of available bandwidth for streaming multimedia data; (ii) a decrease in the amount of computing resources consumed while streaming multimedia data; (iii) an increase in the amount of computing resources available for streaming multimedia data; (iv) a decrease in network congestion and/or the amount of data transferred during streaming; (v) a reduction and/or elimination of buffering, lagging, stoppage in play, and/or blocking the establishment of new streaming connections as a result of queuing delays and packet loss; (vi) a reduction in the amount of data transferred via a mobile data network, and thus, a reduction in the amount of mobile data consumed; and (vii) a reduction in the amount of battery consumed by a computing device while streaming multimedia data.

Referring now to various embodiments of the invention in more detail, FIG. 1 is a functional block diagram of a network computing environment, generally designated 100, suitable for operation of a video analysis program 101 in accordance with at least one embodiment of the invention.

FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computer system 102, client device 104, and playback history database 106 interconnected over network 108. In embodiments of the invention, network 108 can be a telecommunications network, a local area network (LAN), a wide area network (WAN), such as the Internet, or a combination of the three, and can include wired, wireless, or fiber optic connections. Network 108 may include one or more wired and/or wireless networks that are capable of receiving and transmitting data, voice, and/or video signals, including multimedia signals that include voice, data, and video formation. In general, network 108 may be any combination of connections and protocols that will support communications between computer system 102, client device 104, playback history database 106, and other computing devices (not shown) within network computing environment 100.

In some embodiments, network 108 is any combination of connections and protocols that will support streaming video and audio, such as the real-time transfer protocol (RTP), real-time streaming protocol (RTSP), real-time transport control protocol (RTCP), and HTTP (for media to be streamed that is stored on a web server). In some embodiments, network 108 is any combination of connections and protocols that will support broadcast or "live" streaming between computer system 102 and a plurality of client devices, such as client device 104. In some embodiments, network 108 is any combination of connections and protocols that will support unicast streaming between computer system 102 and a plurality of client devices, such as client device 104. In some embodiments, network 108 is any combination of connections and protocols that will support multicast streaming between computer system 102 and a plurality of client devices, such as client device 104. For example, network 108 exists within an internet protocol (IP) network that supports user datagram protocol (UDP). In an embodiment, internet group management protocol (IGMP) is added on top of UDP to further support receiving multicast messages by a client device, such as client device 104. In an embodiment, a reliable multicast protocol is added on top of UDP. The addition of a reliable multicast protocol on top of UDP provides loss detection and retransmission of lost datagrams. For example, pragmatic general multicast (PGM) or scalable reliable multicast (SRM) is added on top of UDP.

In various embodiments of the invention, computer system 102 is a computing device that can be a standalone device, a management server, a web server, a media server, a mobile computing device, or any other programmable electronic device or computing system capable of receiving, sending, and processing data. In other embodiments, computer system 102 represents a server computing system utilizing multiple computers as a server system, such as in a cloud computing environment. In an embodiment, computer system 102 represents a computing system utilizing clustered computers and components (e.g. database server computers, application server computers, web servers, and media servers) that act as a single pool of seamless resources when accessed within network computing environment 100. In general, computer system 102 represents any programmable electronic device or combination of programmable electronic devices capable of executing machine readable program instructions and communicating with client device 104 and playback history database 106 within network computing environment 100 via a network, such as network 108.

Computer system 102 includes video analysis program 101. Although video analysis program 101 is depicted in FIG. 1 as being integrated with computer system 102, in alternative embodiments, video analysis program is remotely located from computer system 102. For example, video analysis program 101 can be integrated with client device 104. Computer system 102 may include internal and external hardware components, as depicted and described in further detail with respect to FIG. 3.

Client device 104 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, client device 104 represents any programmable electronic devices or combination of programmable electronic devices capable of executing machine readable program instructions and communicating with computer system 102, playback history database 106, and other computing devices (not shown) within computing environment 100 via a network, such as network 108.

Client device 104 includes user interface 110. User interface 110 provides an interface between client device 104, computer system 102, and playback history database 106. In some embodiments, user interface 110 can be a graphical user interface (GUI) or a web user interface (WUI) and can display text, documents, web browser windows, user options, application interfaces, and instructions for operation, and includes the information (such as graphic, text, and sound) that a program presents to a user and the control sequences the user employs to control the program. In some embodiments, client device 104 accesses media streamed from computer system 102 via a client-based application that runs on client device 104. For example, client device 104 includes mobile application software that provides an interface between client device 104 and computer system 102.

In some embodiments, user device 104 accesses media streamed from computer system 102 via web-based application that runs on web browser 112. Web browser 112 is a software application for retrieving, presenting, and traversing web resources on the World Wide Web ("WWW"). A web resource is anything that can be obtained from the WWW, such as webpages, e-mail, information from databases, and web services. In some embodiments, web browser also stores HTTP cookies (i.e., web cookies, browser cookies, or cookie) in playback history database 108. Cookies are small pieces of data sent from a webpage used to record a user's browsing activity (e.g., which buttons or links were clicked, which webpages a user previously visited, and which portions of a video or audio accessed by a link on a webpage a user watched or listened to).

Playback history database 106 is a data repository that can store, gather, and/or analyze information. In some embodiments, playback history database 106 is located externally to computer system 102 and client device 104 and accessed through a communication network, such as network 108. In some embodiments, playback history database 106 is stored on computer system 102. In some embodiments, playback history database 106 may reside on another computing device (not shown), provided that playback history database 106 is accessible by computer system 102 and client device 104.

In embodiments of the invention, video analysis program 101 stores and accesses various information to/from playback history database 106, including, but not limited to media streamed via client device 104, user playback history information, logical segment classifications, logical segment insight information, logical segment recommendations, as well as confidence scores associated with logical segment insight information. In embodiments of the invention, user playback history includes a user's various interactions while streaming media via client device 104 (e.g., starting and stopping a video, scrubbing the video, skipping segments of the video skipped, pausing the video, and replaying portions of the video).

In embodiments of the invention, video analysis program 101 divides multimedia data into a plurality of logical segments. A logical segment may generally be understood as a portion of multimedia data over a given amount of time. For example, given a three-minute-long video, video analysis program 101 divides the video into three 60-second-long logical segments. In some embodiments, video analysis program 101 generates classifications for each logical segment. A classification may generally be understood as a category into which something is put. For example, video analysis program 101 generates classifications for logical segments based, at least in part, on (i) a context and/or (ii) a content associated with the multimedia data encompassed by each logical segment.

In embodiments of the invention, video analysis program 101 generates a plurality of insights. Each insight is relative to user's tendency to either view or skip a segment of a multimedia file streamed via client device 104. In embodiments of the invention, video analysis program 101 generates confidence scores for each insight. Here, a confidence score may generally be understood as a score of confidence that an insight is accurate. In some embodiments, video analysis program 101 updates or adjusts the confidence scores based on a user's interactions while viewing streaming media. In other words, video analysis program 101 learns over time a user's viewing habits based on whether a user follows a recommendation generated by video analysis program 101. For example, video analysis program 101 recommends that a user skip a logical segment having a classification "sports" and provides the user with a confidence score of 89 out of 100. However, if the user views the logical segment having a classification "sports," video analysis program adjusts the confidence score to 83.

In embodiments of the invention, video analysis program 101 generates recommendations for each logical segment. Generally, recommendations for each logical segment include but are not limited to recommending the user to skip or play a particular logical segment. In some embodiments, recommendations are based on analyzing user's interactions while streaming multimedia data. In some embodiments, recommendations are generated based on comparing the classification of each logical segment being streamed to the user's insights. In some embodiments, recommendations are generated based on comparing the classification of each logical segment to the respective confidence score. In some embodiments, video analysis program 101 displays recommendations and/or confidence scores as annotations to the user. In embodiments of the invention, video analysis program 101 updates or adjusts recommendations based on a user's interactions while streaming multimedia data.

Figure 2:
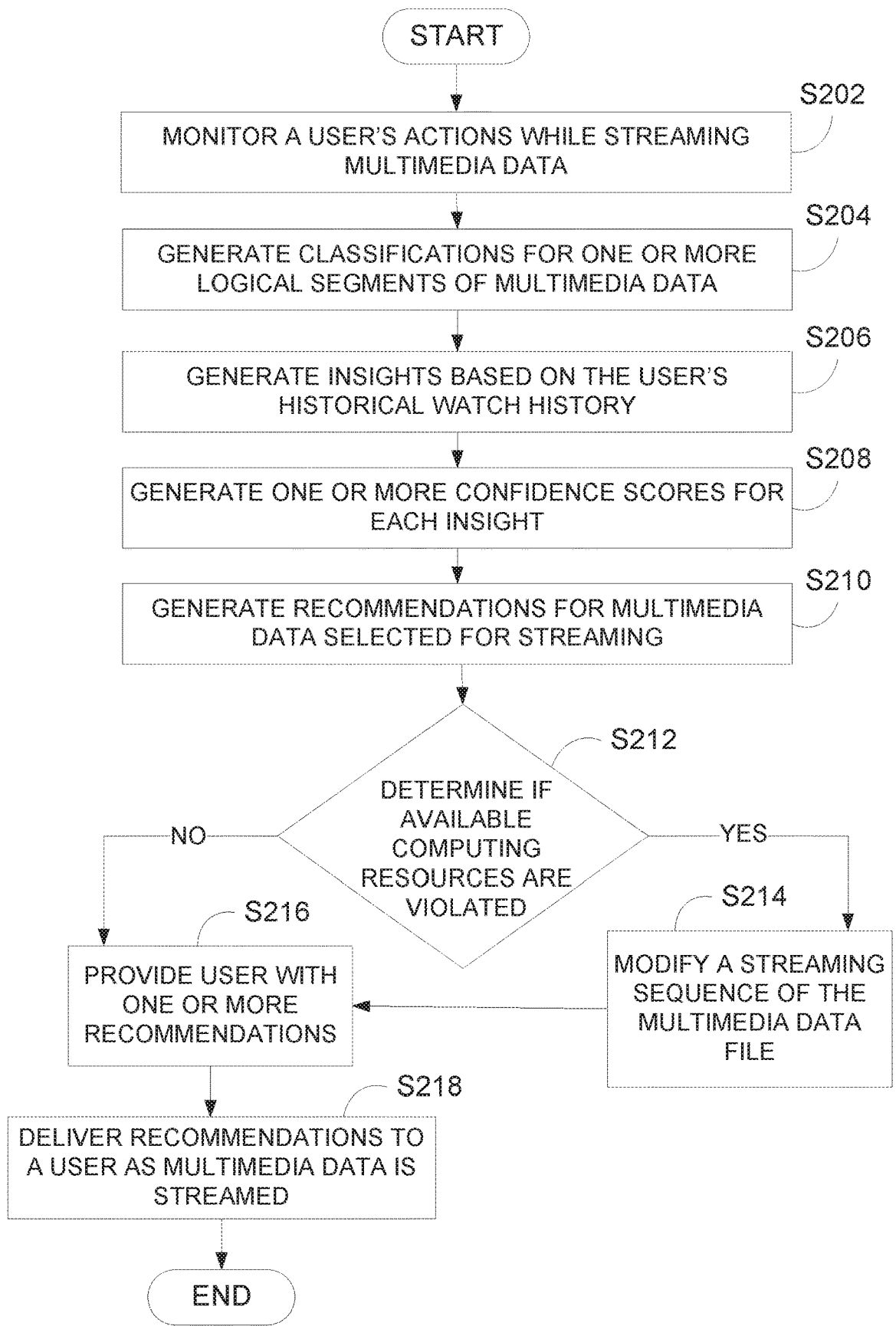
FIG. 2 is a flow chart diagram depicting operational steps for a video analysis program 101 in accordance with at least one embedment of the invention.
Figure 3:
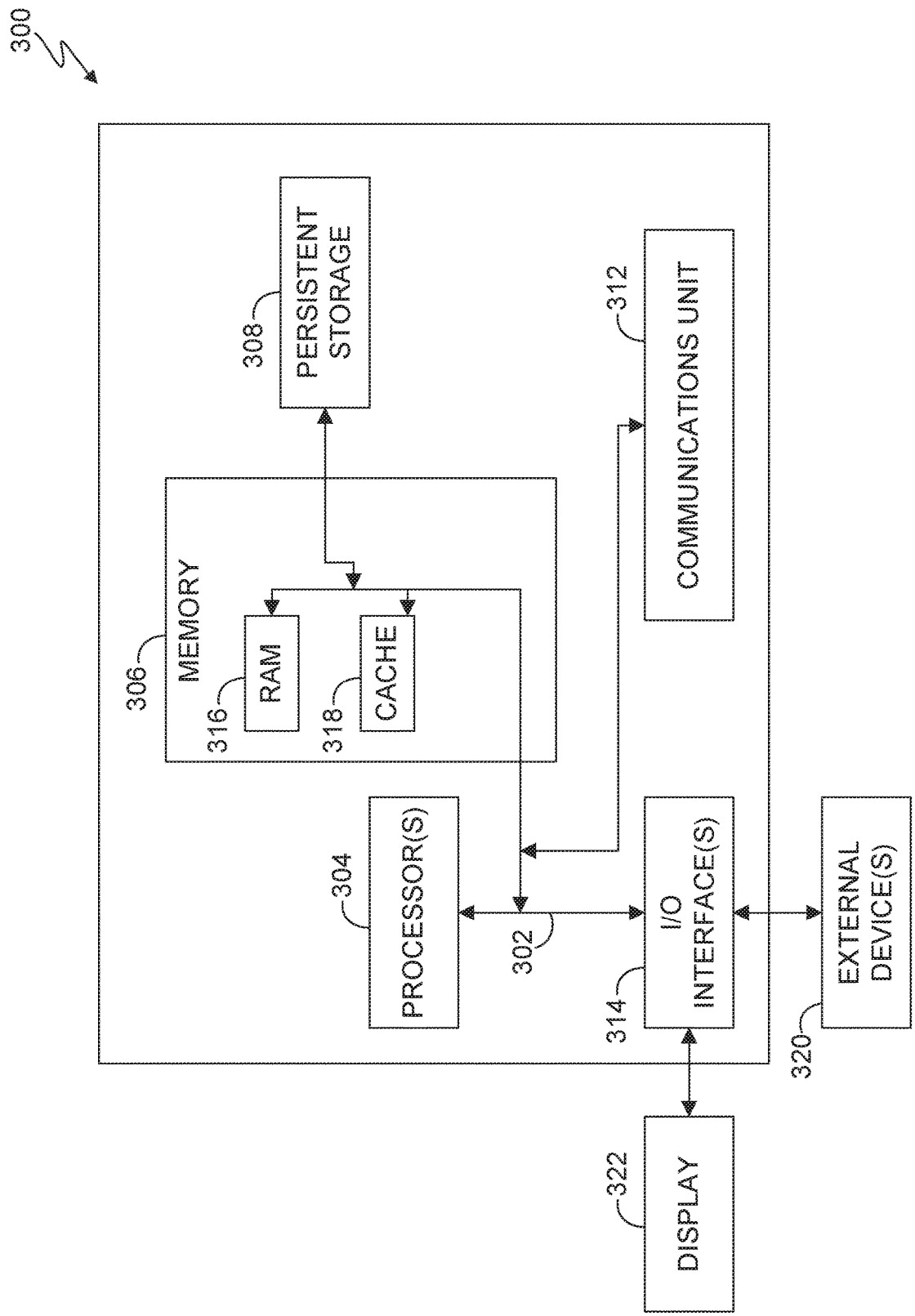
FIG. 3 is a block diagram depicting components of a computer, generally designated 300, suitable for executing video analysis program 101 in accordance with at least one embodiment of the invention.

FIG. 2 is a flow chart diagram depicting operational steps for video analysis program 101 in accordance with at least one embodiment of the invention. It should be appreciated that embodiments of the present invention provide at least for reducing the amount of computing resources required for streaming multimedia data stored on a first computing system, such as computer system 102 to a second computing system, such as client device 104. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, video analysis program 101 monitors a user's actions while streaming multimedia data via client device 104. In some embodiments, monitoring a user's actions includes tracking the user's interactions with client device 104 during streaming. In some embodiments, video analysis program 101 tracks a user's interactions through the use of user activity monitoring software. User activity monitoring may generally be understood as a record of information related to user actions while communicating with or otherwise interacting with a computer system (e.g., client device 104) or software (e.g., a streaming application.) More specifically, user monitoring is the monitoring and recording of user actions, including, but not limited to the use of applications, opening of windows, cursor movements, mouse clicks, key-strokes, text entered or edited, URL's visited, files accessed, downloaded, and/or streamed, and the transfer of data to and from client device 104.

In these embodiments, user activity monitoring software may be implemented on at least one of computer system 102 and client device 104, such that various user action information is automatically transmitted in real-time to video analysis program 101 via network 108. In some embodiments, user activity monitoring software is implemented on client device 104 as mobile application software. In some embodiments, video analysis program 101 receives user action information recorded as image or video data. For example, video analysis program 101 receives screen-captures (i.e., "screen-shots") or video recordings of the screen display of client device 104 captured via session recording software installed on at least one of client device 104 and computer system 102. Tracking user history includes the recording of a user's behavior for video streaming. In some embodiments, video analysis program 101 tracks user history via video playback. Video playback refers to a user's interaction with the multimedia. In some embodiments, video analysis program 101 tracks when a user starts, stops, scrubs, and/or skips a segment of the multimedia. In some embodiments, video analysis program 101 tracks user history of video streaming by tracking how many times the user replayed a video or segments of a video.

In some embodiments, monitoring a user's actions includes determining a focus area of the user while streaming multimedia data via client device 104. In these embodiments, video analysis program 101 analyzes images and or video data captured by a camera or video camera to determine a user's eye position and eye movement. In an embodiment, video analysis program 101 determines a focus area based, at least in part, on tracking the user's eye position and eye movements relative to the display screen of client device 104. For example, video analysis program 101 determines if the user is looking at the display screen of client device 104 during streaming.

In an embodiment, video analysis program 101 determines a focus area based, at least in part, on tracking a user's eye position and eye movements relative to a position of the media displayed via the display screen of client device 104. For example, the display screen can be divided into a number of quadrants or partitions. Based on the user's eye position relative to a particular quadrant(s) of the display screen, video analysis program 101 determines the user focus area relative to where the media is displayed. It should be appreciated that by determining a user's focus area during streaming, video analysis program 101 can determine whether a user is actively viewing streaming multimedia. Accordingly, video analysis program 101 adjusts insights and associated confidence scores based on a user's focus area.

In some embodiments, monitoring a user's actions includes analyzing a user's speech while streaming multimedia data via client device 104. For example, video analysis program 101 records speech generated by a user via a built-in-microphone on client device 104. In these embodiments, video analysis program 101 correlates a user's speech to the content being streamed at the time of the speech. In some embodiments, video analysis program 101 analyzes a user's speech based, at least in part, on speech to text ("STY") software and natural language processing. In other embodiments, video analysis program analyzes a user's speech based, at least in part, on automatic speech recognition ("ASR") software. It should be appreciated that by analyzing a user's speech relative to when particular content is being streamed, video analysis program 101 can determine whether a user is paying attention, and thus interested in the particular content.

At step S204, video analysis program 101 generates classifications for one or more logical segments of the multimedia data. In other words, video analysis program 101 divides the original media into one or more logical segments based on a change in the context or content of the media. In some embodiments, video analysis program 101 further designates one or more classifications to each logical segment based on context or content. For example, video analysis program 101 divides an original media file into 3 logical segments. Video analysis program further gives classifications of "unboxing," "product overview," and "usage review" to the 3 logical segments based on context or content.

In some embodiments, video analysis program 101 generates classifications for a logical segment of the media based on determining a context associated with a logical segment. In an embodiment, video analysis program 101 determines the context of a logical segment based, at least in part, on analyzing metadata (e.g., via natural language processing software) corresponding to the media (e.g., titles, chapters, descriptions, tags, producer information, and media channel information).

In an embodiment, video analysis program 101 determines a context associated with a logical segment based, at least in part, on employing a visual context ontology, corresponding image dataset and image analysis (i.e., employing high-quality information from objects in an image or video sequence through the devising of patterns and trends through machine learning methods). A visual context ontology may generally be understood as a collection of contextual concepts, wherein each concept is composed of words or phrases that correspond to a concept. Each concept is associated with a collection of images that represent the concept. Using supervised machine learning, such as pattern recognition, the collection of images that represent each concept is used to train concept classifiers. Here, a concept classifier assigns each input value (e.g., image or video data) to one of a given set of classes (i.e., contexts).

In an embodiment, video analysis program 101 determines a context associated with a logical segment based, at least in part, on text mining software to extract keywords corresponding to speech produced in a logical segment. Text mining (i.e., text data mining, text analytics) is the process of deriving high-quality information from text. Within the field of text mining, keyword extraction is the automatic identification of terms that best describe or characterize the subject of a textual passage. Here, video analysis program 101 transcribes speech into text through speech to text software and identifies keywords within the transcribed textual passage. In an embodiment, video analysis program 101 determines a context associated with a logical segment based, at least in part, on speech analytics software (i.e., audio mining software) to spot keywords and phrases from a set of verbal utterances.

In some embodiments, video analysis program 101 generates classifications for a logical segment of the multimedia data based, at least in part, on the content associated with a logical segment. In an embodiment, video analysis program 101 determines the content associated with a logical segment based, at least in part, on image analysis software. Image analysis is the extraction of meaningful information from images by means of digital image processing techniques. For example, video analysis program 101 employs object-based image analysis (i.e., video segmentation and classification) to classify objects within the media.

In some embodiments, video analysis program 101 generates classifications for a logical segment of the multimedia data based, at least in part, on a topic or theme associated with speech included in the media. In an embodiment, video analysis program 101 determines a topic or theme associated with speech included in the multimedia data based, at least in part, on speech analytics software. Speech analytics software is the process of analyzing categorical topics of discussion by isolating words and phrases that are most frequently used within a given time period and indicating whether the usage is trending up or down. For example, if the term "mobile phone" and "settings" is identified from a conversation more than five times within a one-minute time period, video analysis program 101 may determine that the current topic of discussion of a logical segment revolves around "mobile phone settings."

In an embodiment, video analysis program 101 determines the content associated with a logical segment based, at least in part, on speech to text software. For example, if video analysis program 101 determines that time 0 to 20 seconds of the multimedia data pertains to unboxing and 21 to 60 seconds pertains to tutorial for product X, video analysis program classifies time 0 to 20 seconds as unboxing and 21 to 60 seconds as tutorial for product X.

At step S206, video analysis program 101 generates insights based on a user's historical watch history. In embodiments of the invention, in order to generate insights, video analysis program 101 analyzes a user's actions relative to a type of classification generated for each logical segment streamed via client device 104. For example, video analysis program 101 determines that a user skipped a segment of a video associated with the unpackaging of a mobile phone (i.e., classification "unpackaging of product"). In another example, video analysis program 101 determines that a user watched prolonged segments of a video when a close-up of application "X" was shown (i.e., classification "software application"). In yet another example, video analysis program 101 determines that a user skipped all segments of a video related to application "Y" (i.e., classification "product Y").

In response to analyzing a user's interactions relative to the content or context for each logical segment, video analysis program 101 generates an insight based, at least in part, on analyzing a user's actions (determined in step S202) relative to the same type of classification over a predefined period of time. For example, video analysis program 101 determines that a user typically skips the unpackaging of a product segment of a video. In another example, video analysis program 101 determines that for application review videos, a user typically watches iOS application reviews, but skips Android application reviews. In yet another example, video analysis program 101 determines that for product guide videos, a user typically skips segments associated with marketing content, but watches segments associated with technical content. In a further example, video analysis program 101 determines that when watching videos, a user typically watches product unpackaging segments on weekends, but on weekdays, typically skips directly to produce usage segments.

In some embodiments, determining an insight is further based, at least in part, on analyzing (i) temporal information, (ii) calendar information, and (iii) location information for each logical segment streamed via client device 104. In these embodiments, video analysis program 101 analyzes a user's interactions relative to a time of day, day of the week, and location where the user streamed the media. For example, video analysis program 101 determines that a user typically skips video segments of longer duration on a workday. In another example, video analysis program 101 determines that a user typically watches video segments of longer duration on a weekend. In yet another example, video analysis program 101 determines that a user typically skips segments about sports when streaming media from an office setting.

At step S208, video analysis program 101 generates one or more confidence scores for each insight. In some embodiments, video analysis program 101 generates a confidence score for an insight based, at least in part, on an ability of video analysis program 101 to classify a logical segment. In an embodiment, a confidence score is based, at least in part, on a degree of associativity between the content of a logical segment and a particular classification. The higher the confidence score, the more likely that a logical segment is associated with a particular classification. The lower the confidence score, the less likely that a logical segment is associated with a particular classification.

In some embodiments, video analysis program 101 generates a confidence score based, at least in part, on a user's historical interaction information with respect to a particular classification. For example, if a user skipped viewing a logical segment having a classification "X" 9 out of 10 times, video analysis program 101 may determine a strong pattern of skipping logical segments having a classification "X." However, if a user skipped viewing a logical segment having a classification "Y" 5 out of 10 times, video analysis program may determine a weak pattern of skipping logical segments having a classification "Y." The stronger the pattern strength, the higher the confidence score. The weaker the pattern strength, the lower the confidence score. In an embodiment, pattern strength is based on a percentage. In an embodiment, pattern strength is based on a scale (e.g., 0-10).

At step S210, video analysis program 101 generates recommendations for multimedia data selected for streaming by a user of client device 104. In embodiments of the invention, video analysis program 101 generates a recommendation for each classification associated with a logical segment of the multimedia data. In embodiments of the invention, video analysis program 101 generates recommendations based on analyzing insight information corresponding to each type of classification identified in the multimedia data. In other words, video analysis program 101 compares classifications of each logical segment of the media to insights previously generated for the same types of classifications. For example, video analysis program determines that the media to be streamed includes a first logical segment having the classification "unpackaging of product." Based on the classification "unpackaging of product," video analysis program 101 previously determined the following insight: "The user typically skips the unpackaging segment of videos (89% confidence score)." Accordingly, video analysis program 101 determines the following recommendation based on analyzing this insight information (e.g., skip viewing of the first logical segment).

In some embodiments, video analysis program 101 generates recommendations for a user prior to streaming the multimedia data to client device 104. In these embodiments, classifications for the media to be streamed are known. Here, classifications associated with the media are known if a previous user streamed the same media and video analysis program 101 generated classifications for the media in accordance with step S204. In embodiments of the invention, video analysis program determines recommendations based on correlating an insight to a classification.

In some embodiments, video analysis program 101 generates recommendations for a user after streaming multimedia data to client device 104 has begun. In these embodiments, classifications for the media are unknown. Here, classifications associated with the media are unknown if a previous user has yet to stream the same media and video analysis program 101 has yet to generate classifications for the media. In these embodiments, video analysis program 101 determines, in real-time, one or more classifications for each logical segment of the media after streaming has begun.

At decision step S212, video analysis program 101 determines if available computing resources are violated. In some embodiments, video analysis program 101 determines if available computing resources are violated prior to receiving a request from a computing device, such as client device 104, to stream a multimedia data file. In some embodiments, video analysis program 101 determines if available computing resources are violated after receiving a request from a computing device, such as client device 104, to stream a multimedia data file. In some embodiments, video analysis program 101 determines that available computing resources are violated if an amount of available bandwidth for streaming media from a server, such as computer system 102, is below a predetermined threshold level. In some embodiments, video analysis program 101 determines that available computing resources are violated if an amount of available bandwidth for streaming media via a computing system, such as client device 104, is below a predetermined threshold.

In some embodiments, video analysis program 101 determines that available computing resources are violated if an amount of user traffic accessing a webpage to stream media is above a predetermined threshold level. In some embodiments, video analysis program 101 determines that available computing resources are violated if network congestion (i.e., network traffic) of a network, such as network 108, is above a predetermined threshold level. For example, network congestion may include, but is not limited to, an ability of a router to transfer data for streaming. In some embodiments, determining if available computing resources are violated saves amount of data transferred, battery power of devices, and/or increases available bandwidth.

In some embodiments, video analysis program 101 determines that available computing resources are violated if a battery level of a computing device for transmitting streaming multimedia data, such computer system 102, is below a predetermined threshold level. In some embodiments, video analysis program 101 determines that available computing resources are violated if a battery level of a device for receiving streaming multimedia data, such as client device 104, is below a predetermined threshold level. In some embodiments, video analysis program 101 determines that available computing resources are violated if an amount of data in a network data plan of a device for transmitting streaming multimedia data, such as computer system 102, is below a predetermined threshold level. In some embodiments, video analysis program 101 determines that available computing resources are violated if an amount of data in a network data plan for a device for receiving streaming multimedia data, such as client device 104, is below a predetermined threshold level.

If video analysis program 101 determines that available computing resources are violated, video analysis program 101 proceeds to step S214 (decision step "YES" branch). If video analysis program 101 determines that available computing resources are not violated, video analysis program 101 proceeds to step S216 (decision step "NO" branch).

At step S214, responsive to determining that available computing resources are violated, video analysis program 101 modifies a streaming sequence of the multimedia data file. In some embodiments, modifying a streaming sequence is based, at least in part, on preventing data packets corresponding to one or more logical segments included in the multimedia data file from being streamed to a computing device, such as client device 104. In some embodiments, video analysis program 101 modifies a streaming sequence of the multimedia data file based, at least in part, on a recommendation to skip viewing of a logical segment. In some embodiments, modifying a streaming sequence of the multimedia data file is further based, at least in part, on a confidence score associated with an insight used to derive the recommendation to skip a logical segment being above a predetermined threshold level.

For example, a multimedia data file to be streamed to client device 104 includes a first logical segment having a classification "A," a second logical segment having a classification "B," and a third logical segment having a classification "C." Each logical segment is 60 seconds in duration. Based on each classification for a logical segment, video analysis program 101 determines: (i) a first recommendation to view the first logical segment (confidence score of 90), a second recommendation to skip the second logical segment (confidence score of 95), and a third recommendation to view the third logical segment (confidence score of 75). In this example, video analysis program 101 modifies the streaming sequence of the multimedia data file if the confidence score associated with an insight used to derive a recommendation to skip a logical segment is above an 85. Accordingly, since the second recommendation to skip the second logical segment has a confidence score of 95, video analysis program 101 modifies the streaming sequence of the multimedia data file by preventing the second logical segment from being streamed to client device 104. Here, streaming will begin with the first logical segment for 0:00 to 1:00 seconds and will continue streaming the second logical segment from 1:00 to 2:00 seconds. In other words, the second logical segment is skipped, and streaming seamlessly transitions from the end of the first logical segment to the beginning of the third logical segment.

At step S216, video analysis program 101 provides a user of client device 104 with one or more recommendations. In some embodiments, recommendations include advising a user to skip or view a logical segment of the multimedia data file. For example, video analysis program 101 generates a pop-up window with the following information: "It is recommended that the user skip viewing the video from 0:30 seconds to 1:30 seconds. In some embodiments, recommendations include annotating a media player timeline user interface to indicate which segments of the video the user should watch, and which segments the user should skip. In some embodiments, recommendations to watch or skip a segment is based, at least in part, on a confidence score associated with an insight used to derive a recommendation. In these embodiments, the recommendation is accompanied by the confidence score. In some embodiments, video analysis program 101 displays annotations in a hoverbox. A hoverbox can include a popup window which displays when the mouse is placed over an icon on the screen for a short period of time, without clicking. In some embodiments of the invention, video analysis program 101 displays a recommendation upon clicking on the playback history. In some embodiments of the invention, video analysis program 101 displays the recommendations automatically as the multimedia is streamed.

In alternative embodiments of the invention, video analysis program 101 modifies a streaming sequence of a multimedia data file streamed to client device 104 irrespective of whether available computing resources are violated. In these embodiments, video analysis program 101 modifies a streaming sequence of a multimedia data file if a confidence score associated with an insight used to derive a recommendation to skip a logical segment is above a given threshold level.

At step S218, video analysis program 101 delivers the recommendations to a user as the multimedia data is streamed to client device 104. In some embodiments, video analysis program delivers the recommendations to web browser 112 via a web-based application. In some embodiments, video analysis delivers the recommendations via user interface 110 via a client-based application.

FIG. 3 is a block diagram depicting components of a computer 300 suitable for video analysis program 101, in accordance with at least one embodiment of the invention. FIG. 3 displays the computer 300, one or more processor(s) 304 (including one or more computer processors), a communications fabric 302, a memory 306 including, a RAM 316, and a cache 318, a persistent storage 308, a communications unit 312, I/O interfaces 314, a display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over the communications fabric 302, which provides communications between the computer processor(s) 304, memory 306, persistent storage 308, communications unit 312, and input/output (I/O) interface(s) 314. The communications fabric 302 may be implemented with an architecture suitable for passing data or control information between the processors 304 (e.g., microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random-access memory (RAM) 316 and a cache 318. In general, the memory 306 may comprise any suitable volatile or non-volatile one or more computer readable storage media.

Program instructions for video analysis program 101 may be stored in the persistent storage 308, or more generally, any computer readable storage media, for execution by one or more of the respective computer processors 304 via one or more memories of the memory 306. The persistent storage 308 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received, and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for streaming multimedia data, comprising:
    generating a recommendation to skip viewing of a logical segment in a plurality of logical segments included in a multimedia data file based, at least in part, on analyzing user insight information corresponding to a classification associated with the logical segment;
    determining that a confidence score associated with the recommendation to skip viewing of the logical segment in the plurality of logical segment is above a predetermined threshold level;
    determining that at least one of a battery level of the computing device and an amount of available data in a network data plan associated with the computing device is below a predetermined threshold level; and
    responsive to determining that (i) the confidence score associated with the recommendation to skip viewing of the logical segment in the plurality of logical segments is above the predetermined threshold level and (ii) at least one of the battery level of the computing device and the amount of available data in the network data plan associated with the computing device is below the predetermined threshold level:
        modifying a streaming sequence of the plurality of logical segments included in the multimedia data file streamed to the computing device.

2. The computer-implemented method of claim 1, wherein the user insight information is determined based, at least in part, on analyzing a user's historical actions while streaming logical segments of multimedia data having a same type of classification as the logical segment.

3. The computer-implemented method of claim 1, wherein modifying the streaming sequence of the plurality of logical segments included in the multimedia data file includes:
    preventing data packets corresponding to the logical segment from being streamed to the computing device.

4. A computer program product for streaming multimedia data, the computer program product comprising one or more computer readable storage media and program instructions stored on the one or more computer readable storage media, the program instructions including instructions to:
    generate a recommendation to skip viewing of a logical segment in a plurality of logical segments included in a multimedia data file based, at least in part, on analyzing user insight information corresponding to a classification associated with the logical segment;
    determine that a first confidence score associated with the first recommendation to skip viewing of the first logical segment in the plurality of logical segments included in the first multimedia data file is above a predetermined threshold level;
    determine that at least one of a battery level of the computing device and an amount of available data in a network data plan associated with the computing device is below a predetermined threshold level; and
    responsive to determining that (i) the confidence score associated with the recommendation to skip viewing of the logical segment in the plurality of logical segments is above the predetermined threshold level and (ii) at least one of the battery level of the computing device and the amount of available data in the network data plan associated with the computing device is below the predetermined threshold level:
        modify a streaming sequence of the plurality of logical segments included in the multimedia data file streamed to the computing device.

5. The computer program product of claim 4, wherein the user insight information is determined based, at least in part, on program instructions to analyze a user's historical actions while streaming logical segments of multimedia data a same type of classification as the logical segment.

6. The computer program product of claim 4, wherein the instructions to modify the streaming sequence of the plurality of logical segments included in the multimedia data file includes:

preventing data packets corresponding to the logical segment from being streamed to the computing device.

7. A computer system for streaming multimedia data, the computer system comprising:

one or more computer processors;

one or more computer readable storage media;

computer program instructions;

the computer program instructions being stored on the one or more computer readable storage media for execution by the one or more computer processors; and the computer program instructions including instructions to:

generate a recommendation to skip viewing of a logical segment in a plurality of logical segments included in a multimedia data file based, at least in part, on analyzing user insight information corresponding to a classification associated with the logical segment;

determine that a first confidence score associated with the first recommendation to skip viewing of the first logical segment in the plurality of logical segments included in the first multimedia data file is above a predetermined threshold level;

determine that at least one of a battery level of the computing device and an amount of available data in a network data plan associated with the computing device is below a predetermined threshold level; and responsive to determining that (i) the confidence score associated with the recommendation to skip viewing of the logical segment in the plurality of logical segments is above the predetermined threshold level and (ii) at least one of the battery level of the computing device and the amount of available data in the network data plan associated with the computing device is below the predetermined threshold level:

modify a streaming sequence of the plurality of logical segments included in the multimedia data file streamed to the computing device.

8. The computer system of claim 7, wherein the user insight information is determined based, at least in part, on program instructions to analyze a user's historical actions while streaming logical segments of multimedia data having a same type of classification as the logical segment.

9. The computer system of claim 7, wherein the instructions to modify the streaming sequence of the plurality of logical segments included in the multimedia data file includes:

preventing data packets corresponding to the logical segment from being streamed to the computing device.

* * * * *